B. A. ADLER.
DIFFERENTIAL.
APPLICATION FILED DEC. 26, 1914.
1,252,641.
Patented Jan. 8, 1918.
2 SHEETS—SHEET 1.
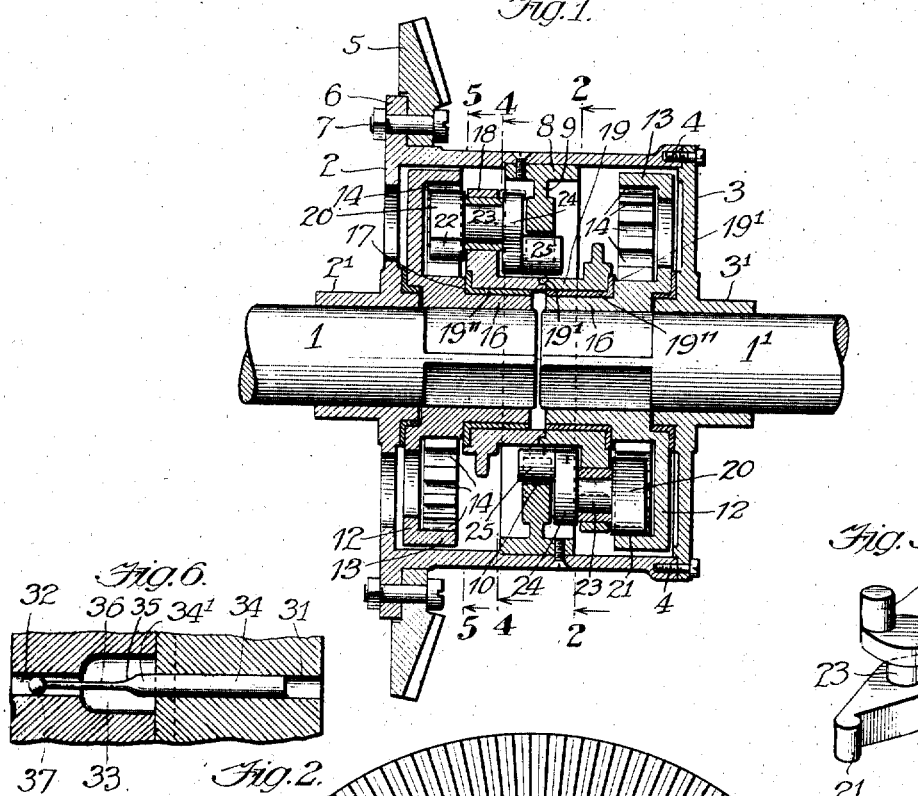
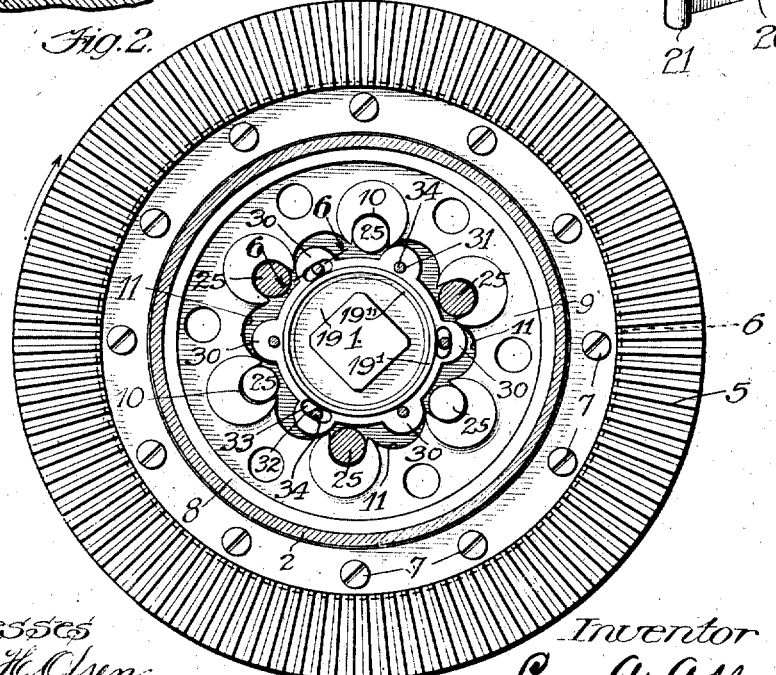
Witnesses
Martin H. Olsen
F. T. Simpson
Inventor
Bror A. Adler
By Warwick Chamberlain
Atty.

B. A. ADLER.
DIFFERENTIAL.
APPLICATION FILED DEC. 26, 1914.

1,252,641.

Patented Jan. 8, 1918.
2 SHEETS—SHEET 2.

Witnesses
Martin H. Olsen.
J. T. Simpson

Inventor
Bror A Adler
By Clarence Chamberlain
Atty.

UNITED STATES PATENT OFFICE.

BROR A. ADLER, OF CHICAGO, ILLINOIS, ASSIGNOR TO PETER A. LORENZ, OF CHICAGO, ILLINOIS.

DIFFERENTIAL.

1,252,641.      Specification of Letters Patent.      Patented Jan. 8, 1918.

Application filed December 26, 1914. Serial No. 879,007.

*To all whom it may concern:*

Be it known that I, BROR A. ADLER, a subject of the King of Sweden, residing at the city of Chicago, in the county of Cook and State of Illinois, have invented certain new and useful Improvements in Differentials, of which the following is a specification.

My invention relates to the mechanism which is used to communicate power to independent shafts as those of the driving wheels of motor vehicles, and at the same time to allow for differences of speed at which the said wheels travel when divergent from a straight line. The disadvantages of the ordinary geared differential are manifold, but the fundamental and radical one results from the fact that the power is not positively applied to either wheel, but that the power which each wheel receives is dependent on the traction of the other wheel on the roadway; that is, that no more power will be transmitted than corresponds to the resistance of that wheel which has the least adhesive friction on the roadway. My invention provides means by which the power of the engine is transmitted directly and positively to each wheel independently of the other wheel. The power applied to each wheel (less friction losses) is the full power of the engine limited only by its frictional contact with the roadway, and less the power actually absorbed by the other wheel. The mechanism is free from gears and pinions, eliminating the noise and friction thereof. It is simple, and being free from expensive machine work, is cheap to manufacture.

The principles of my invention are illustrated in the drawings, in which—

Figure 1 shows a longitudinal section;

Fig. 2 is a section of Fig. 1 on the line 2—2;

Fig. 3 is a member by which connection is made between the driving and driven elements;

Fig. 6 is a section on the line 6—6 of Fig. 2.

Figure 4:
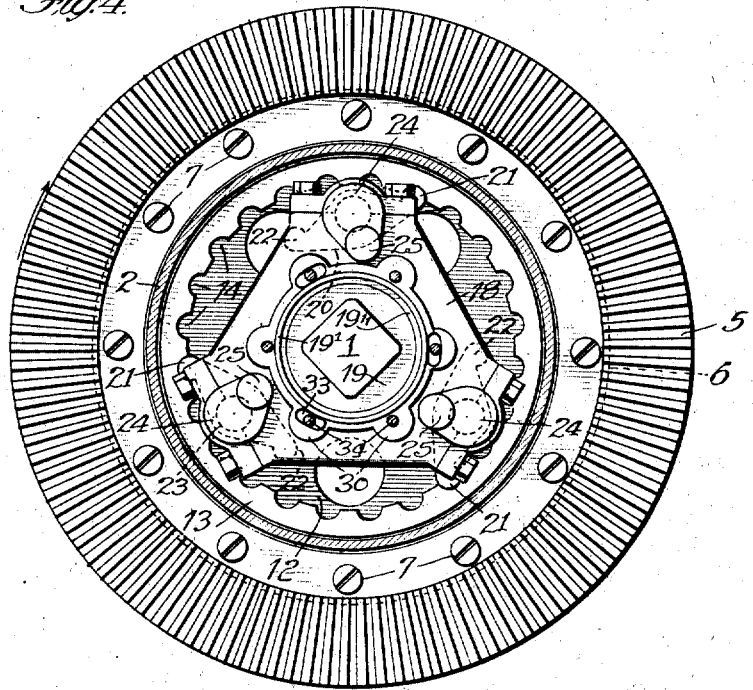
Fig. 4 is a section of Fig. 1 on the dotted line 4—4.

Further describing my invention with reference to the drawings, in which like characters of reference denote like parts throughout; 1 and 1' are the parts of a divided axle of the full floating type supported in alinement with each other by bearings and a casing (not shown) in the usual and well-known manner. A support, which may be in the form of a shell or casing, consisting of the parts 2 and 3, secured together at 4, is journaled at 2' and 3' on the two sections of the shaft. An annular beveled gear 5, may be attached to the flange 6 of the shell 2, 3 by bolts 7, or other means. Within the said shell or support is secured a driving element 8, which is in annular form, having the inwardly projecting flange 9. The said flange is interrupted to form two series of alternately placed notches 10 and 11. On each side of the said driving element is a driven element, consisting of an annular disk 12, having an inwardly projecting flange 13, which is provided on its inner face with a multiplicity of symmetrical notches 14, thereby forming an annular rack. The said driven elements are rigidly secured to the ends of the shaft sections against rotation thereon, and for this purpose the ends of the shaft sections are squared and adapted to be inserted within correspondingly squared openings in the inwardly extended sleeves 16. The said sleeves are machined on their outer surfaces to form bearings 17, for the intermediate or transmission elements 18, which are interposed between the driving and driven elements hereinbefore described. The said intermediate or transmission elements by which the power is communicated from 8 to 16 have inwardly projecting sleeves 19 preferably notched on their inner and facing ends as shown at 19' to insure axial alinement and are further provided with bushings 19''. Mounted on the said intermediate elements are the members shown in perspective in Fig. 3. Said members may consist of a double ended dog 20, having the engaging projections 21 and 22. Said dog is mounted on one end of a short shaft 23, while on the other end thereof is a crank 24, having a wrist pin 25 off-set at right angles to the dog 20. One or more of the said connecting members shown in Fig. 3 are to be mounted upon the intermediate element. As shown said element is a spider having three arms off-set at angles of 120 degrees from each other, although the number of arms and connecting members, as well as the form of the intermediate element, may be varied as desired. When mounted on the said intermediate member, so that shaft 23 will turn freely thereon, the projections 20 and 22 are adapted alternatively to engage within the notches 14. The wrist pins 25, projecting inwardly are received within the notches 10 of the driving element. When constructed as shown with three of such members on the intermediate elements, the driven member should be provided with six of said notches spaced 60 degrees from each other, whereby the wrist pins projecting thereinto will alternate from either side about its circumference.

Figure 5:
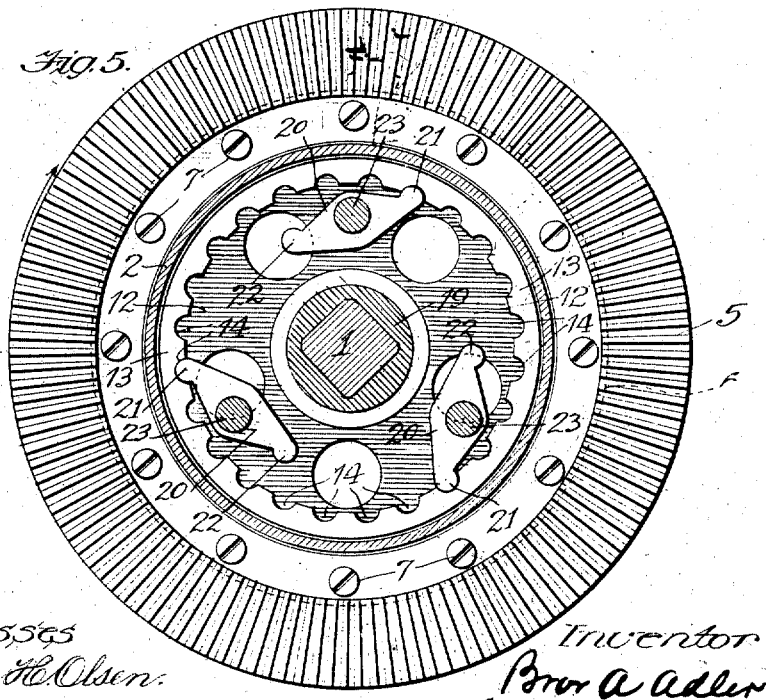
Fig. 5 is a similar section on the line 5—5.

When power is applied through the gear 5, the shell 2, 3, and the driving element 8, turning them to the right as indicated in Figs. 4 and 5, the engagement of wrist pins 25 in notches 10 will turn said wrist pins and the connecting dogs to the positions shown in Figs. 4 and 5, thereby causing said dogs to engage in the circular racks, and transmit the power to the axles, upon which the driven members are irrevolubly secured. It will be seen that the power thus applied is applied to each wheel through the medium of the axle sections independently of the other wheel. When the vehicle is turned from a direct line the power will remain positively communicated to the slow moving wheel; that is, the one following the curve of shortest radius, while the difference in the speed of the two wheels is provided for by a disengagement of the ratchet connections with the outside or faster moving wheel. This will continue until the vehicle resumes its movement in a straight line, when the engagement will be restored and the power applied to both wheels equally. When the direction of the power is reversed the engagement of the wrist pins within the notches of the driving element will cause the other end of the dog to be engaged within the rack in the opposite direction, the operation as the vehicle runs backwardly being the same as before described.

The sleeves 19 of the transmission elements are provided with bosses or projections 30, regularly spaced about their periphery and extended parallel to the longitudinal axis. Said bosses should correspond in number to the notches 11 in the driving element, and should be of such size that they will be received loosely therein, to make a non-rigid connection. The relation in size and spacing of said bosses and notches to each other should be such that when the wrist pins 25 are engaged within the notches 10, and the dogs 20 are in operative relation to the rack on the driven element, the bosses 30 will be engaged within notches 11, thereby relieving the strain on the wrist pins and the connecting members.

In order that the transmission elements and the various parts thereof may be held in normal relation about their axes, I provide a device which is shown in enlarged form in Fig. 6. The corresponding and facing bosses on the two intermediate elements have the longitudinal openings 31 and 32. One of said openings, however, is broadened as at 33. A pin of spring steel has the shank 34 firmly seated in one of the openings 31. A portion thereof 34' extends within the chamber 33, while a further extension 35, is formed into a leaf spring 36, terminating in the rounded end 37. I prefer to place the round and oval openings in the bosses alternately, so that the pins will be alternately seated and the spring portions thereof be alternately projected and operative about the peripheries of the two sleeves. A slight variation of the transmission elements with reference to each other is thus provided. Such variation is limited by the engagement of part 34' of pin 34 within the chamber 33, while the action of the spring portion 36 tends at all times to hold the parts in normal relation.

Having thus fully described my invention what I claim as new and desire to secure by Letters Patent is—

1. In a differential; the combination with a two piece shaft, and driven elements irrevolubly secured on the proximate ends thereof, of a driving element between the driven elements, intermediate elements between the driving element and the driven elements, and shafts on the intermediate elements each having a double ended dog on one end engageable with the driven element adjacent thereto and also provided with a crank having a wrist pin on the other end engageable with the driving element.

2. In a differential; the combination with a two piece shaft, of driven elements irrevolubly secured on the proximate ends thereof, a driving element provided with notches, transmission elements, one on each side of said driving element and shafts on the transmission elements provided with double ended dogs on one end to engage the driven element, said shafts being further provided with cranks having wrist pins on the other end to engage the notches of the driving element.

3. In a differential; the combination with a two piece shaft, of driven elements irrevolubly secured on the proximate ends thereof, each of said elements being provided with an annular rack, a driving element provided with notches, transmission elements one on each side of said driving element having stub shafts mounted thereon, double ended dogs on one end of each of said stub shafts to engage the said rack, and cranks on the other end of the stub shafts to engage the notches in said driving element.

4. In a differential; the combination with a two piece shaft, of driven elements irrevolubly secured on the proximate ends thereof, a support revoluble on the shaft, a driving element on the support provided with notches, transmission elements between the driven elements and the driving element, and double ended dogs mounted on stub shafts journaled in the transmission elements and provided with cranks having wrist pins to engage within the notches on the driving element whereby the ends of said dogs will alternatively engage the driven elements.

5. In a differential; the combination with a two piece shaft, of driven elements irrevolubly secured on the proximate ends thereof, a driving element provided with two series of notches, transmission elements revolubly mounted on the shaft and provided with sleeves having bosses thereon engageable with one series of notches of the driving element, and devices mounted on the transmission element provided with means engageable with the other series of notches on said driving element whereby said device will engage with and actuate the driven element.

6. In a differential; the combination with a two piece shaft, of driven elements irrevolubly secured on the proximate ends thereof, a driving element, a plurality of transmission elements provided with axially alined openings between said driving element and driven elements, and elastic means in said openings for keeping said transmission elements in yielding relation to each other.

7. In a differential; a revoluble casing, a two-piece shaft axially journaled therein, an annular inwardly projecting driving member in the casing, driven members on each side of the driving member irrevolubly mounted on the ends of the shaft and provided with annular racks, intermediate elements on each side of the driving member, stub shafts journaled in the intermediate elements, cranks on the inner ends of the stub shafts to engage the driving member, and double ended dogs on the other ends of the stub shafts to engage the said annular racks.

In witness whereof, I have hereunto subscribed my name, this nineteenth day of December, 1914, in the presence of two subscribing witnesses.

BROR A. ADLER.

Witnesses:
C. K. CHAMBERLAIN,
A. S. PHILLIPS.